United States Patent [19]

Niedrach

[11] Patent Number: 5,130,081
[45] Date of Patent: Jul. 14, 1992

[54] OPERATION LIFE OF ON-LIFE BOILING WATER REACTORS

[75] Inventor: Leonard W. Niedrach, Schenectady, N.Y.

[73] Assignee: General Electric Company, Schenectady, N.Y.

[21] Appl. No.: 502,721

[22] Filed: Apr. 2, 1990

[51] Int. Cl.$^5$ ............................................. G21C 9/00
[52] U.S. Cl. ..................................... 376/305; 376/306
[58] Field of Search ................ 376/305, 306; 428/685, 428/670; 427/6, 5

[56] References Cited

U.S. PATENT DOCUMENTS

| | | | |
|---|---|---|---|
| 3,343,979 | 9/1967 | Hamrin | 427/6 |
| 3,783,005 | 1/1974 | Kenny | 427/5 |
| 4,097,402 | 6/1978 | Grubb | 376/305 |
| 4,123,594 | 10/1978 | Chang | 428/670 |
| 4,477,538 | 10/1984 | Clarke | 428/685 |
| 4,842,811 | 6/1989 | Desilva | 376/301 |
| 4,917,968 | 4/1990 | Tuffias et al. | 428/670 |

FOREIGN PATENT DOCUMENTS 0145262 6/1985 European Pat. Off. .
1210496 2/1966 Fed. Rep. of Germany .

OTHER PUBLICATIONS

"Palladium Impedes Radionuclide Pick-Up in Steel", Platinum Metal Rev., 33 [4], (1989), p. 185.

H. Ocken et al., "Thin Films to Impede the Incorporation of Radionuclides in Austenitic Stainless Steels", Elsevier Sequoia, printed in The Netherlandds, (1989), pp. 323-334.

Chernova, G. P. et al., "Increasing the Passivability and Corrosion Resistance of Stainless Steels by Surface Alloying with Palladium", Plenum Publishing Corporation, UDC 620.197.3, (1982), pp. 406-411.

Chernova, G. P. et al., "Increasing the Passivation Ability and Corrosion Resistance of Chromium Steel by Surface Alloying with Palladium", Surface Technology, 13, (1981), pp. 241-256.

I. R. McGill, "Platinum Metals in Stainless Steels, A Review of Corrosion and Mechanical Properties", Platinum Metals Rev., 34 (2), (1990), pp. 85-97.

T. V. Rao, R. W. Vook, W. Meyer, and C. Wittwer, "Protective Coatings for Radiation Control in Boiling Water Nuclear Power Reactors", J. Vac. Sci. Technol., A 5 (4), (Jul./Aug. 1987), pp. 2701-2705.

Primary Examiner—Brooks H. Hunt
Assistant Examiner—Frederick H. Voss
Attorney, Agent, or Firm—Paul E. Rochford; James C. Davis, Jr.; James Magee, Jr.

[57] ABSTRACT

A method of extending the life of components of in service nuclear reactors or components of existing reactors is taught. The method involves forming a deposit on the surface coatings of metallic elements of the nuclear containment, as well as on the surfaces of encrusted internal components which are exposed to high-temperature, high-pressure water and steam. The deposit formed is a deposit of at least one member of the platinum group of metals. The deposit is formed by electroless deposition. In operation, this deposit facilitates the combination of hydrogen and oxygen to form water and thereby aids in reducing the electrochemical corrosion potential of the system to values below a critical potential that prevents stress corrosion cracking.

10 Claims, 4 Drawing Sheets

OPERATION LIFE OF ON-LIFE BOILING WATER REACTORS

CROSS-REFERENCE TO RELATED APPLICATION

The subject application is closely related to copending application Ser. No. 07/502,720, filed Apr. 2, 1990. The text of the copending application is incorporated herein by reference.

BACKGROUND OF THE INVENTION

The present invention relates generally to improving the operating characteristics of on-line nuclear reactors. More specifically, it relates to improving the useful life of a reactor which has been in operation by limiting or reducing further stress corrosion cracking of components of a boiling water reactor or other reactor components exposed to high-temperature water.

Boiling water reactor components are known to undergo stress corrosion cracking. Stress corrosion cracking is a phenomenon which occurs in apparatus exposed to high temperature and, accordingly, high-pressure water as well as at lower temperatures. The stress arises from differences in thermal expansion, the high pressure needed for the containment, and other sources including residual stress from welding, cold work and other asymmetric treatments. In addition to the stress, other conditions including sensitization of the metal and water chemistry influence the sensitivity to stress corrosion cracking (SCC). This type of corrosion has been widely studied and a number of papers have been written concerning it.

Among them are:
1) F. P. Ford, "Stress Corrosion Cracking", in *Corrosion Processes*, edited by R. N. Parkins, Applied Science Publishers, New York, 1982, p. 271.
2) J. N. Kass and R. L. Cowan, "Hydrogen Water Chemistry Technology for BWRs", in *Proc. 2nd Int. Conf on Environmental Degradation of Materials in Nuclear Power Systems—Water Reactors*, Monterey, Calif., 1985, p. 211.
3) M. E. Indig, B. M. Gordon, R. B. Davis and J. E. Weber, "Evaluation of In-Reactor Intergranular Stress" in *Proc. 2nd Int. Conf on Environmental Degradation of Materials in Nuclear Power Systems—Water Reactors*, Monterey, Calif., 1985, p. 411.
4) L. G. Ljungberg, D. Cubicciotti and M. Trolle, "Materials Behavior in Alternate (Hydrogen) Water Chemistry in the Ringhals-1 Boiling Water Reactor", *Corrosion*, Vol.42, (1986) p. 263.
5) L. W. Niedrach and W. H. Stoddard, "Corrosion Potentials and Corrosion Behavior of AISI304 Stainless Steel In High Temperature Water Containing Both Dissolved Hydrogen and Oxygen", *Corrosion*, Vol. 42, No. 12 (1986) page 696.

It is well documented that stress corrosion cracking occurs at higher rates when oxygen is present in the reactor water in higher concentrations.

As explained in these and other articles, efforts have been made to lower the stress corrosion cracking in boiling water reactor piping by lowering oxygen levels in the cooling water through hydrogen injection to achieve higher concentrations than normally present in the water as a result of radiological decomposition. It has been found that varying amounts of hydrogen have been required to reduce oxygen levels sufficiently to achieve and reliably maintain the critical potential required for protection from the SCC in the high temperature, high pressure water. Accordingly, the problem of stress corrosion cracking of stainless steel components, including piping of boiling water reactors, has remained a significant problem. The present invention is aimed at reducing the amount of $H_2$ required as well as at facilitating reliable maintenance of the corrosion potential below a critical value of $-230$ to $-300$ mV vs. the standard hydrogen electrode (SHE) at which SCC is markedly reduced or even eliminated as indicated in references 3 and 4.

Two additional papers deal with the formation of noble metal deposits on reactor piping and other containment structures and they are as follows:

(6) H. Ocken, C. C. Lin, and D. H. Lister, "Thin Films to Impede the Incorporation of Radio Nucleides in Austenetic Stainless Steels", *Thin Solid Films*, Vol. 171 (1989) pages 323–334.

(7) G. P. Chernova, T. A. Fedosceva, L. P. Kornienko, and N. D. Tomashov, "Increasing Passivation Ability and Corrosion Resistance of Stainless Steel by Surface Alloying with Palladium", *Prot. Met.* (Eng. Transl.) 17 (1981) page 406.

The first of these articles deals with the use of metal deposits and other treatments and deposits to reduce the build-up of radioactivity in components of the circulatory system of a nuclear reactor that are in contact with the coolant.

The second of these articles deals with the electrochemical behavior and general corrosion resistance of stainless steel as distinct from stress corrosion cracking.

One of the by-products of the presence of oxygen in the hot water in contact with the interior of reactor piping and other reactor components is the formation of a surface coating of mixed oxides. The surface coating forms directly on the surface of stainless steel and is a mixture of oxides of the metals of the stainless steel including chromium, iron, and nickel. The surface coating increases in thickness from the time the stainless steel surface is first exposed to the oxygen containing high pressure, high temperature water. The present invention is directed particularly toward reducing the stress corrosion cracking in reactor piping and in other reactor components for reactors which have been on line and have operated for a period of time and which consequently have an interior surface coating of mixed oxides.

BRIEF STATEMENT OF THE INVENTION

It is, accordingly, one object of the present invention to improve the method by which the stress corrosion cracking of an operating boiling water reactor may be reduced through hydrogen injection into the recirculating feedwater.

Another object is to provide a method of operating a boiling water reactor in which the degree of stress corrosion cracking is greatly reduced.

Another object is to improve the stainless steel containment of an operating boiling water reactor to make it less subject to stress corrosion cracking.

Still another object is to modify the stainless steel piping structure of operating boiling water reactors to impart a lower degree of stress corrosion cracking.

Other objects will be in part apparent and in part pointed out in the description which follows.

In one of its broader aspects, objects of the present invention can be achieved by providing a boiling water reactor structure which has operated for a period causing a build-up of corrosion products as an oxide film on the surfaces in contact with high-temperature high-pressure water. A thin film of a noble metal is formed on the surface of the oxide film on the surfaces of the containment system which is exposed to the boiling water. This noble metal may be platinum, or one of the other platinum group of metals of low reactivity and of high catalytic activity for catalytic combination of hydrogen and oxygen. Electroless plating is used to form the deposit of a platinum group metal. This incorporation of a platinum metal on the corroded surface of an on-line reaction can be coupled with injection of hydrogen to achieve significant reduction of stress corrosion cracking and can effectively extend the useful life of the reactor.

As used herein, the term platinum metals has its usual connotation in the art and particularly in the catalytic arts. It includes osmium, ruthenium, iridium, rhodium, platinum, and palladium. The platinum metals can be used as alloys of one platinum metal with another. Osmium, which forms volatile compounds, is preferably not included as a surface layer but is preferably incorporated into an alloy with other platinum metals.

DETAILED DESCRIPTION OF THE INVENTION

Figure 1:
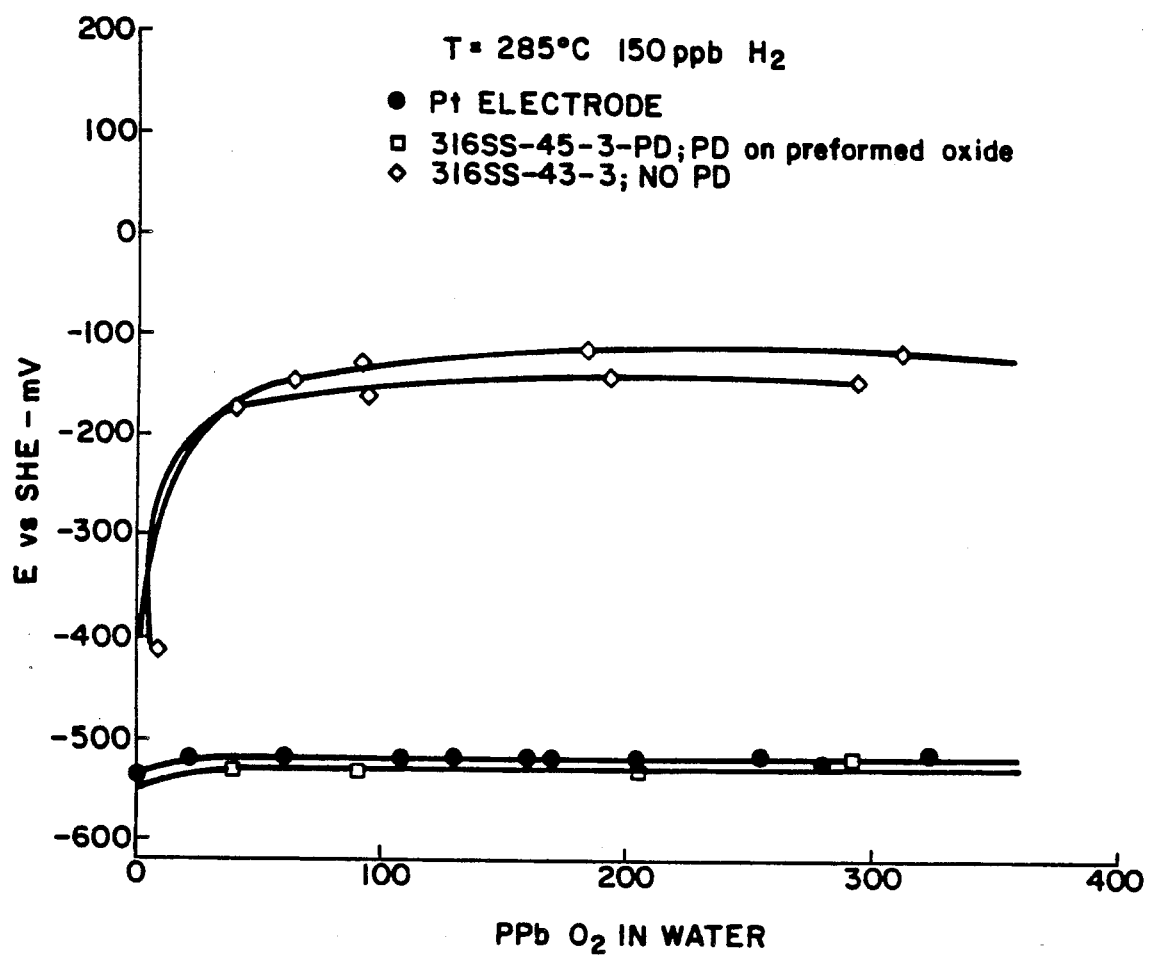
FIG. 1 is a graph in which potential of various electrodes is plotted against oxygen concentration in water. The data shown was obtained with 150 ppb hydrogen also in the water.

It has been observed generally that the presence of oxygen in hot water in contact with reactor containment elements results in higher stress corrosion rates of these elements as compared to hot water in which little or no oxygen is present.

It has been further observed that stress corrosion cracking of the containment for high-temperature, high-pressure water such as is used for nuclear reactors is subject to change in rate depending on whether the electrochemical potential of the exposed stainless steel of such containment is above or below a range of critical potential values of $-230$ to $-300$ mV vs the SHE (standard hydrogen electrode). Stress corrosion cracking proceeds at a more accelerated rate in systems in which the electrochemical potential is above the critical range and at a substantially lower rate in systems in which the electrochemical potential is below the critical range. Water containing oxygen tends to result in potentials above the critical range while water in which little or no oxygen is present tend to have potentials below the critical range.

One way in which corrosion potentials of stainless steels in contact with reactor water containing oxygen can be reduced below the critical range is by injection of hydrogen into the water generally in amounts that stoichiometrically exceed the amount of oxygen in the water. This tends to lower the concentration of dissolved oxygen in the water and also the corrosion potential of the metal.

This injection of hydrogen into the high-temperature, high-pressure water in reactor containments has been effective in reducing stress corrosion. It has been found, however, that varying amounts of hydrogen have been required for different reactors in order to reliably and efficiently achieve the desired low potentials.

What I propose herewith is the modification of the internal surfaces of the stainless steel containment system in boiling water reactors which have been operating for a period of time and which have developed a surface deposit of material on the metal surfaces exposed to the high temperature high pressure water. Such deposit is believed to include mixed nickel, iron, and chromium oxides as well as other mixed ingredients. This modification is made in order to improve the catalytic activity of the exposed encrusted surface toward the hydrogen-water redox couple and thereby the reliability and efficiency of achieving corrosion potentials below the critical range. Before this was tried, it was not at all apparent whether there would be any effect at all because of the presence of the complex surface deposits.

It was known that the injection of hydrogen into the high-temperature, high-pressure water has been effective in reducing the stress corrosion cracking of the containment for such high-temperature, high-pressure water. However, it was my belief that the increase in the catalytic activity at the surface of the containment exposed to the hydrogen-containing water would improve the effectiveness of the so-called "hydrogen water chemistry" for on-stream reactors even though they had developed deposits and scale on the surfaces exposed to the steam and hot water. By this "hydrogen water chemistry" is meant that there is a different chemistry in water which contains hydrogen usually to the extent of 150 parts/billion or more, than there is when the hydrogen is at lower values. For this hydrogen water chemistry to be effective the hydrogen must always be present in stoichiometric excess of the oxygen present and there must be a reduction or suppression of stress corrosion cracking as a result of the presence of the dissolved hydrogen. However, it was my belief that this stress corrosion cracking could be reduced to an even greater extent by increasing the catalytic activity at the surface of the deposited scale in contact with the high-temperature, high-pressure water. In particular, I have found that the deposition of a small amount of a catalytically active material such as at least one metal of the platinum group of metals on the surface of the crust and scale exposed to the high-temperature, high-pressure water is effective in reducing the corrosion potential or electrochemical potential at the surface of the crust and thereby in reducing the stress corrosion cracking which occurs below the surface of the crust.

Thus, although I have found that the injection of hydrogen into the high-temperature, high-pressure water can be effective in reducing the stress corrosion cracking, I have found that the effectiveness of the hydrogen in this role is limited by the irreversibility of the hydrogen-water redox couple on oxidized and encrusted stainless steel surfaces. What I have proposed and what I have demonstrated experimentally is that the improvements in the reversibility of the hydrogen-water redox couple on surface deposits formed on stainless steel surfaces can be achieved by increasing the catalytic activity at the surface of the deposits, thus facilitating the achievement of a desired lower corrosion potential, even with a presence of higher residual oxygen concentrations than can be tolerated in the absence of the catalyst.

Further, I have found that this lower potential can be achieved with lower concentrations of hydrogen than have been needed and have been used in the prior art hydrogen water chemistry without the catalyst. Thus, I have recognized that the low corrosion potentials which are the objectives of the hydrogen water chemistry efforts to reduce stress corrosion cracking can be achieved more reliably and in the presence of relatively high residual oxygen concentrations by increasing the catalytic activity not only at the metal surface but actually above the metal surface, and in fact at the top surface of the crust of surface deposits formed above the stainless steel surface as a result of the normal operation of the nuclear reactor. I have discovered that it is possible to achieve the lower corrosion potentials more efficiently and with less hydrogen than in the absence of the catalyst.

I have proposed to improve the catalytic activity at the surfaces of the crust of deposits by forming a deposit of a platinum group metal on the surface of the crust. It is well-known in the art that platinum group metals can be electrolessly plated on ceramic surfaces or on glass or on plastic surfaces. The techniques for causing such deposits, as well as other metal deposits, to form are well-known in the art and the compositions which are used in such practices, as well as specific recipes for their use, are commercially available. However, the potential value of forming such a coating of a metal of the platinum group of metals on the mixed oxide crust which is present on the surfaces of reactor component which are exposed to the high temperature, high pressure water, and the potential value of employing such a coating on the mixed oxide crust in combination with injection of hydrogen to provide a catalyzed hydrogen water chemistry within an operating reactor was not known and was not used as I have proposed to use it. Moreover, the catalytic effect of the placing of such a surface layer of a metal of the platinum group of metals on the mixed oxide crust on the interior of piping and other reactor components was not known or used prior to my conception and testing of this possibility. I have found, however, that the formation of a layer of a platinum group metal on the surface of the mixed oxide crust, by ordinary electroless plating means well-known in the art, does have the surprising effect of engendering a catalyzed hydrogen water chemistry so that the combination of the layer of the metal of the platinum group of metals on the mixed oxide crust taken together with the injection of hydrogen into the water circulated within the reactor over the metal surfaces bearing the crust has the effect of reducing the electrochemical potential and of consequently reducing the stress corrosion cracking of the on-line reactor.

I have found that the catalytic activity at the surfaces of the crust of deposits can be improved by the use of conventional commercially available agents which can be used to electrolessly plate plastic or ceramic or similar surfaces. The agents are usually used in sequence. A first such agent is one which sensitizes the surface to be plated. Stannous chloride has been used for such sensitization. A next such agent is an activation agent. A palladium containing agent is often used to activate a surface which has been sensitized by the stannous chloride. The sensitizing and activating steps are sometimes done sequentially through use of separate agents and sometimes done simultaneously through the use of a single composition which may contain the two separate agents in colloidal form. The last step of the electroless plating is the deposit of a layer of a metal of the platinum group of metals. This may be done using commercially available plating solutions of metal complex and reducing agent and employing commercial processing steps of temperature control and the like well-known in the art. In other words, the process for forming a layer of a metal of the platinum group of metals on a surface crust of mixed oxides is a process which involves at least two steps. When the layer of a platinum group of metals is to be formed directly on a fresh metal surface, as is described in the copending application, Ser. No. 07/502,720 filed Apr. 2, 1990, the layer of platinum group metal can be formed directly and without the need for the use of the at least two-step process required in forming the layer on the mixed oxide crust.

In other words, the formation of a surface layer of a platinum metal on the oxide surface coating inside the reactor piping is done by electroless plating agents and procedures well-known in the art. These conventional agents and procedures are employed within the reactor vessel and piping subsequent to initiation of the operation of the reactor and in fact after a number of years of such operation. In this way, a finely divided deposit of the platinum metal will form on the surfaces of the oxide deposits on the stainless steel through a reaction with the aid of an appropriate electroless reducing agent.

My method and the beneficial results obtainable therefrom is illustrated by the following examples:

EXAMPLE 1

A coupon of 316 stainless steel identified as 316SS-47-3 was prepared for testing. The coupon was 2" long, ⅜" wide, and ⅛" thick.

The coupon was placed in a test loop which had been set up for a series of water chemistry studies. This loop was a closed loop provided with a pump to circulate water through an autoclave where the water was maintained at high-temperature, high-pressure and passed over the test specimens. The system was brought to a temperature between 280° and 285° C. and water containing 150 ppb (parts per billion) of dissolved hydrogen was circulated to flow over the specimen coupons at a flow rate of 200 milliliters per minute. Following a day's operation in this fashion, oxygen gas was also introduced into the feed water and the level of the oxygen gas was increased incrementally over a period of days. The autoclave treatment was carried out for seven months with variations in the water chemistry and the sample was then removed from the autoclave.

The sample identified as Coupon 316SS-47-3 was then electrolessly plated with palladium without removing the oxide film that had formed on the surface during some seven months of alternating exposure to 280° to 285° C. water under boiling water reactor normal water chemistry and hydrogen water chemistry conditions.

In order to form a palladium deposit on the corroded stainless steel surface, I found it necessary to modify the deposition procedure employed in depositing palladium on fresh metal surfaces. The modification involved introducing a preactivation step. The preactivation step involved exposure of the corroded surface of the sample to be coated with palladium to a stannous chloride containing solution to sensitize and to activate the oxide coated sample surface. Exposure to the stannous chloride containing solution prior to exposure to the palladium solution involved a sequence of treatments with commercially available compositions known as Shipley baths 404, 44, and 19. Following the preactivation treatment, the procedure employed is that used for forming a palladium deposited on a fresh metal surface and involves the treatment of the activated surface with a commercially available palladium solution. This treatment employed a commercial procedure of the Callery Chemical Company of Pennsylvania, and known as "First Choice" electroless palladium T-83.

Following the deposition of the palladium, the amount of palladium was determined by x-ray fluorescence measurements using a Seiko x-ray thickness gauge. A thickness of 0.63 μm (micrometer) was determined. The coupon with the coating of palladium was renamed Coupon 316SS-47-3-Pd.

Coupon 316SS-47-3-Pd and a new freshly grit blasted unpalladinized coupon sample identified as 316SS-45-3 were placed in an autoclave and brought to the temperature of 285° C. and run through a series of tests over a period of several months.

Electrical measurements using a zirconia reference electrode as described in L. W. Niedrach and N. H. Stoddard, *Corrosion*, Vol. 91, No. 1 (1985) page 45, were made and data was plotted on a graph as depicted in FIG. 1. FIG. 1 is a graph in which the electrical potential is plotted against the concentration of oxygen in the test water in parts per billion of oxygen.

In one series of tests, the dissolved hydrogen in the feed water was maintained at a nominal 150 parts per billion (ppb) and the oxygen concentration was varied. Data obtained from this study is included in FIG. 1. From the data plotted in FIG. 1, it is clear that the palladinized sample behaves very much like the platinum electrode which is extremely active catalytically toward the hydrogen water couple. Electrode 316SS-45-3 without palladium deposited on its surfaces displayed relatively high potentials in the presence of oxygen in the feed water. Except for very low oxygen concentrations, this electrode has potentials which are considerably above the potential designated as the critical potential, that is above −230 to −300 millivolts based on comparison with SHE.

EXAMPLE 2

Figure 2:
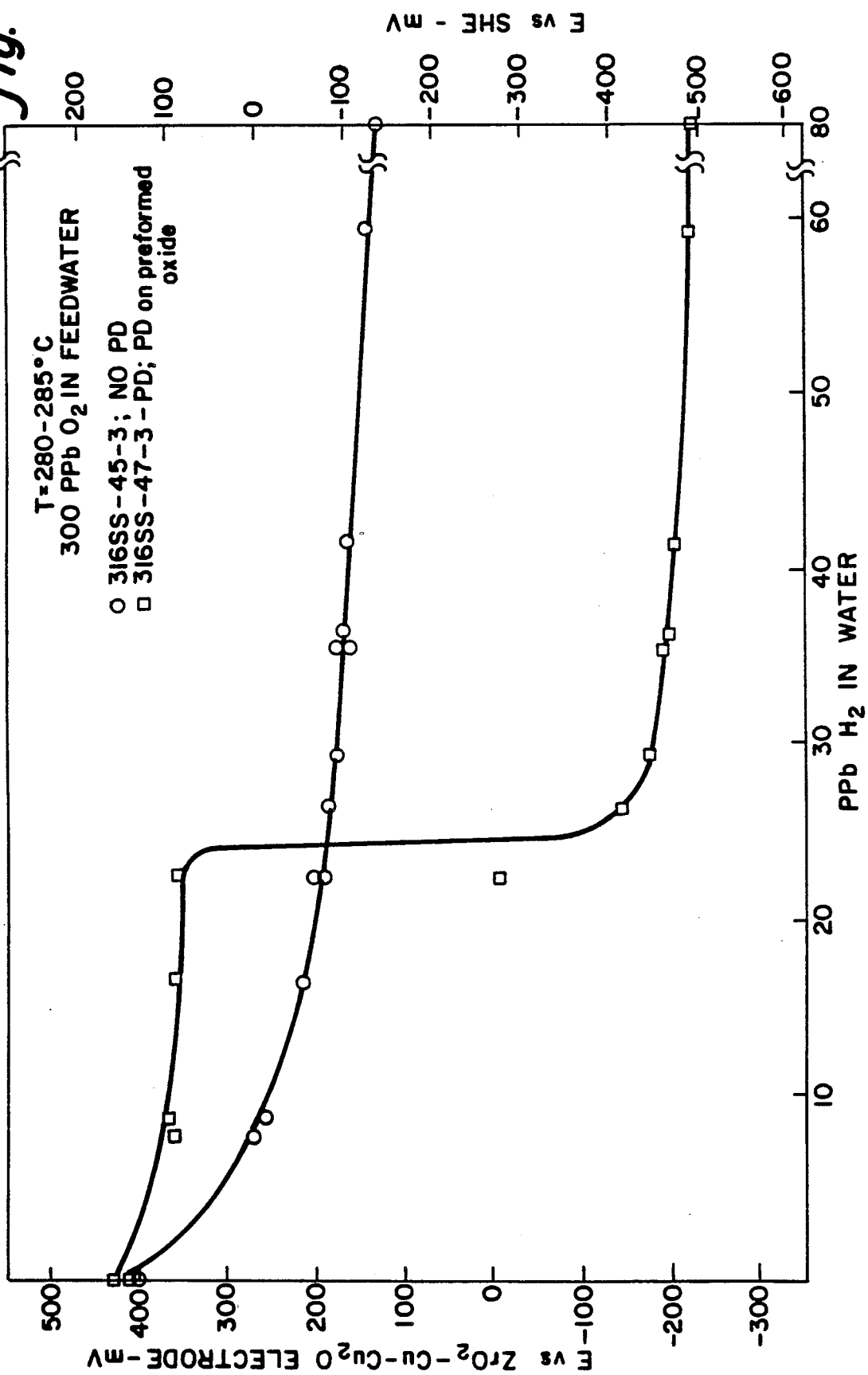
FIG. 2 is a graph in which voltage is plotted against the concentration of hydrogen in water with 300 ppb oxygen also in the water.

In FIG. 2, the effect of palladium treatment is illustrated in a different fashion. The tests carried out which resulted in these data involved increasing the amounts of hydrogen which were added to water containing a fixed amount of oxygen rather than the reverse as was the practice in Example 1. In contrast to the unpalladinized sample, in which case only small transitions of potential occur, with palladium on the surface a large shift from the higher potential range to a low potential range occurs abruptly at about 24 ppb hydrogen. The concentration of hydrogen that is stoichiometrically equivalent to 300 ppb oxygen for the formation of water is 37.5 ppb or 1.56 times the measured amount. Since the recombination reaction is believed to occur only on the surface of the layer of platinum group metal, the lower observed value for hydrogen is deemed to reflect the fact that the diffusion coefficient of hydrogen in water is considerably higher than that of oxygen. As a result, the hydrogen and oxygen in this example are believed to arrive at the electrode surface in stoichiometric ratios for the formation of water even though the ratio of hydrogen to oxygen in the bulk water is substoichiometric.

It is likely that the sharp change in potential of the catalyzed surface does indeed correspond to the point where the flux of the hydrogen and the oxygen to the electrode surface are in stoichiometric balance. From these data, we then see that with the catalyzed surface the potential can be reduced to the desired level with far less hydrogen than is required in the absence of the layer of platinum group metal catalyst. It should be beneficial with regard to the control of nitrogen shine in the turbine building since there is considerable evidence that low hydrogen levels in the water result in less production of volatile nitrogen species.

EXAMPLE 3

Figure 3:
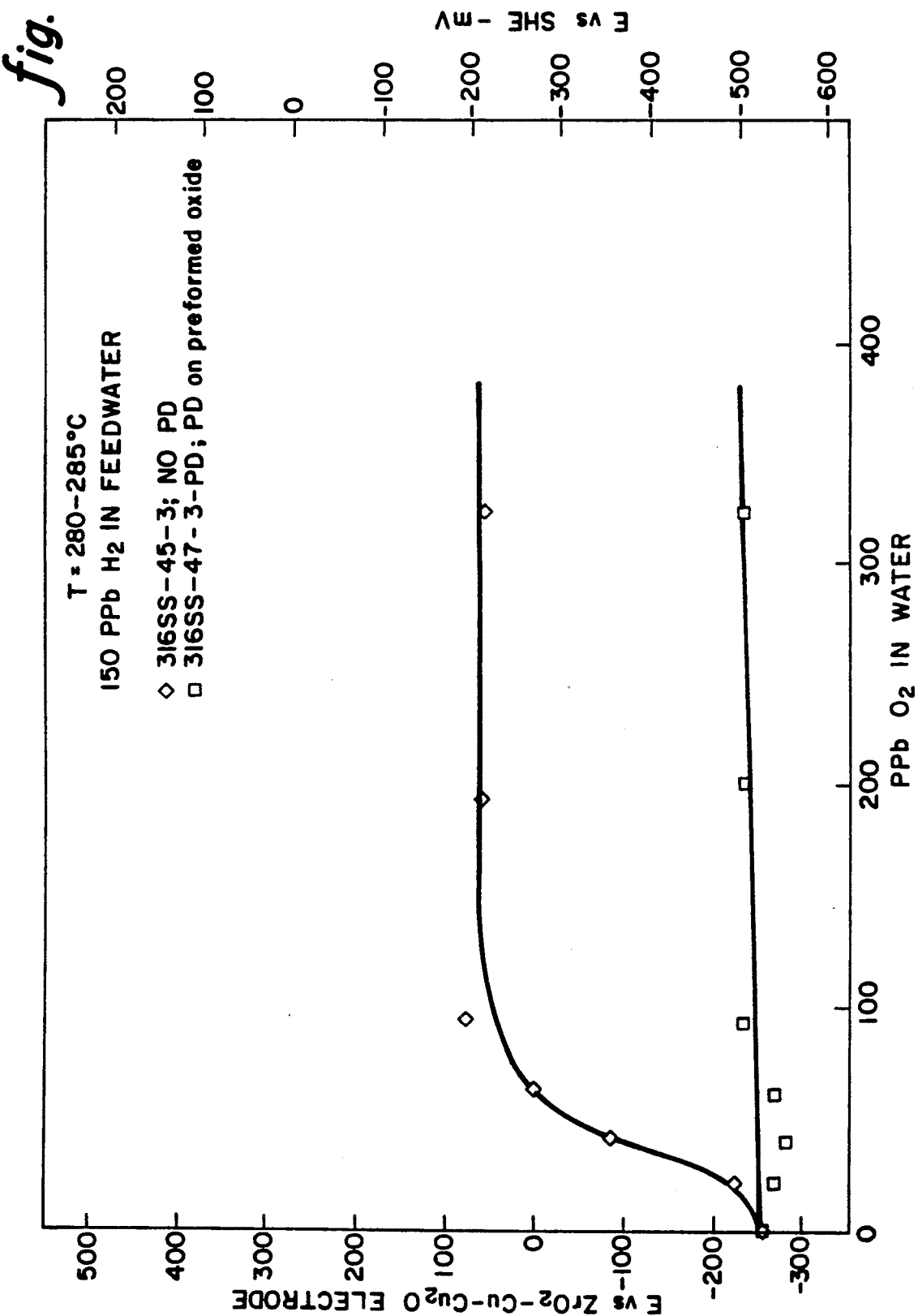
FIG. 3 is a plot in which voltage is plotted against the concentration of oxygen in water with 150 ppb hydrogen also in the water but following months of operation.
Figure 4:
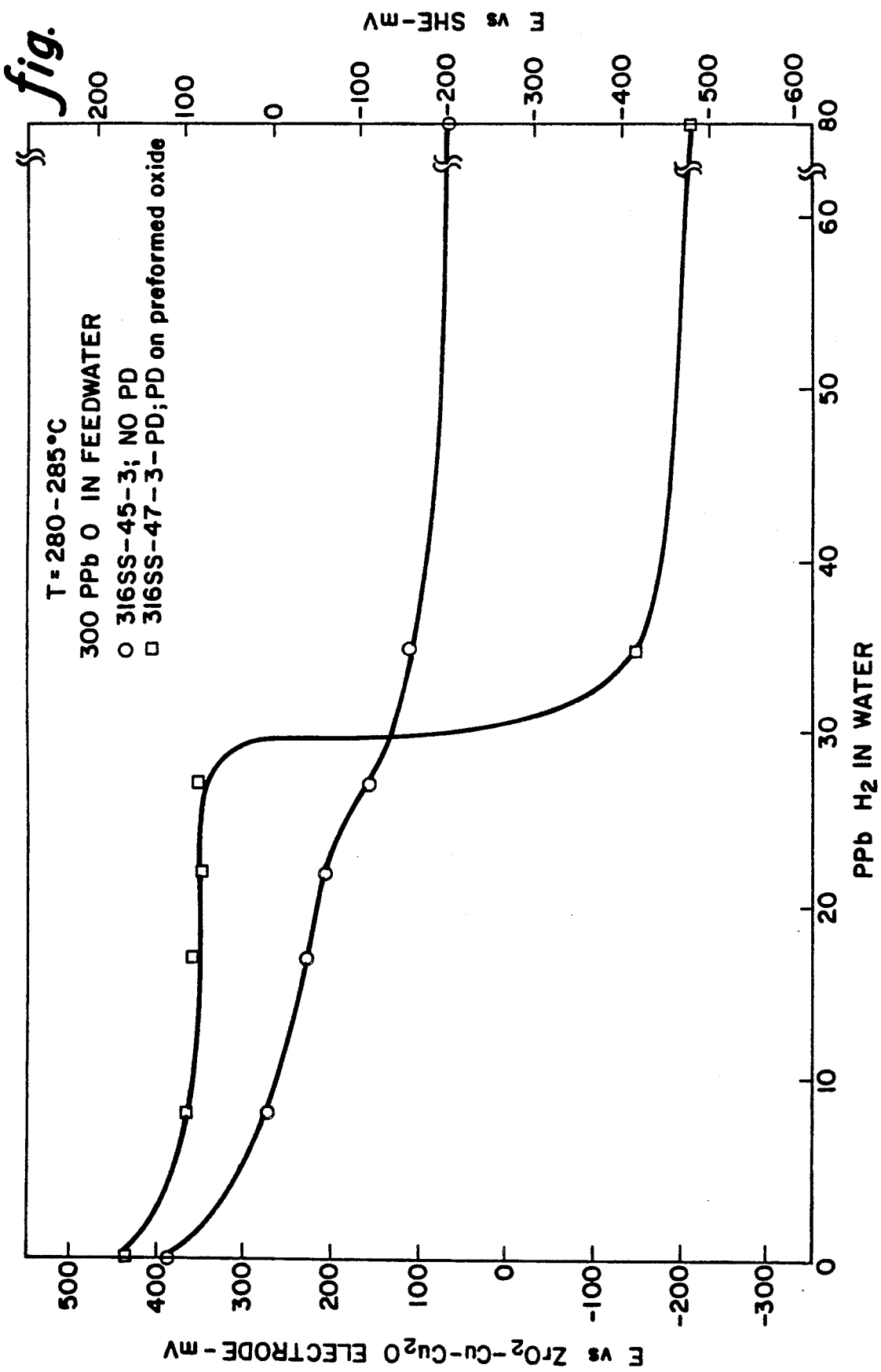
FIG. 4 is a plot similar to that of FIG. 2, but obtained after several months of operation.

Two additional sets of data analogous to those of FIGS. 1 and 2 are shown in FIGS. 3 and 4. These were obtained after a total of 13 months of operation of sample 316SS-CONT-Pd and indicate that the behavior produced by the palladization is retained for extended periods.

Further, only marginal losses of palladium seem to have occurred as evidenced by the final column of thickness gauge data in Table I.

TABLE I

| Palladium Thickness Measurements (micrometers) | | | |
|---|---|---|---|
| Sample | Side | Initial Values | After 6 Months of Operation |
| 316SS-47-3-Pd | 1 | 0.65 ± 0.10* | 0.62 ± 0.10* |
|  | 2 | 0.62 ± 0.07 | 0.63 ± 0.09 |
| 316SS-45-3 | 1 | 0.00 ± 0.05* | 0.00 ± 0.05* |
|  | 2 | 0.00 ± 0.05 | 0.00 ± 0.05 |

*One standard deviation

What is claimed is:

1. The method of reducing the stress corrosion cracking of an on-line boiling water reactor having a mixed oxide crust on the surfaces of the stainless steel components thereof which are exposed to the high temperature, high pressure water of the operating boiling water reactor which comprises, forming on the surface of said mixed oxide crust a thin coating of at least one metal of the platinum group of metals, and maintaining a concentration of dissolved hydrogen gas in the water which contacts the surface coated with the thin coating of the platinum group metal.

2. The method of claim 1, in which the hydrogen concentration is at least 24 ppb where the oxygen concentration is in the range of 200 to 300 ppb.

3. The method of claim 1, in which the metal of the platinum group of metals is palladium.

4. The method of claim 1, in which the metal of the platinum group of metals is platinum.

5. The method of claim 1, in which a two-step process is used in forming the thin coating of metal of the platinum group of metals and involves a first step of sensitizing and activating the surface of the crust of mixed oxides and a second step of plating the metal of the platinum group on the mixed oxide surface.

6. The method of claim 1, in which the thin coating is at least 50 Ångstroms thick.

7. The method of claim 1, in which the thin coating is at least 300 Ångstroms thick.

8. A method of reducing the stress corrosion cracking of an on-line boiling water reactor having a mixed oxide crust on the surfaces of the stainless steel components thereof which are exposed to the high temperature, high pressure water of the operating reactor which comprises, forming on the surface of said mixed oxide crust a thin coating of at least one metal of the platinum group of metals, and maintaining a concentration of dissolved hydrogen gas in the hot, pressurized reactor water, the concentration of hydrogen in said reactor water being less stoichiometrically than the concentration of oxygen in said reactor water.

9. The method of claim 8, in which the hydrogen concentration is at least 24 ppb.

10. The method of claim 8, in which the hydrogen concentration is at least 100 ppb.

* * * * *